Patented Jan. 18, 1938

2,105,943

UNITED STATES PATENT OFFICE 2,105,943

REFRACTORIES

Victor Moritz Goldschmidt, Oslo, Norway

No Drawing. Application July 1, 1935, Serial No. 29,374. In Austria July 13, 1934

24 Claims. (Cl. 106—9)

This invention relates to the manufacture of refractories.

It is among the objects of the invention to provide refractories of improved character which are relatively cheap, readily made, of high refractoriness, and in which difficulties and disadvantages heretofore encountered in connection with refractories made from similar materials are minimized or avoided.

It has been proposed heretofore to manufacture refractories from minerals containing magnesium hydrosilicates, such as talc and serpentine, or containing magnesium orthosilicate, particularly olivine rocks. Such procedures involve the addition of magnesia, or substances rich in magnesia, followed by heating to elevated temperatures. In such procedures the magnesia is added to convert the iron into magnesium ferrite, and the free silica and hydrosilicates to orthosilicate, it being believed that to provide materials of high refractoriness it was necessary to provide at least two mols of MgO per mol. of $SiO_2$. Consequently it has been necessary to use rather pure olivine or the like, or to use rather large amounts of magnesia when working with materials containing substantial amounts of hydrosilicates. Magnesia is a relatively expensive material since the raw material from which it is derived must be calcined to prepare it for use, and high purity olivines are more expensive and less common than those of lower purity. Therefore, such earlier procedures involve economic factors such that the art would welcome less expensive methods which are productive of highly refractory products.

That desideratum presents the problem of producing refractory materials from rocks which contain in addition to olivine, considerable amounts of other mineral substances. The solution of the problem is of significance both technically and economically because impure olivines of the type contemplated are more widely distributed in greater quantities, and are therefore much cheaper, than the pure varieties heretofore considered necessary for making commercially acceptable refractories.

I have discovered, and it is upon this that my invention is in large part predicated, that refractories of highly satisfactory character can be produced, without the use of magnesia, from impure olivines of certain type provided the olivine be properly grain-sized and the material be burned, or fired, in an oxidizing atmosphere, all as will now be explained in detail. More particularly, I have found that by observing the conditions just noted one may not only avoid the use of the relatively expensive magnesia or pure olivine while retaining the desirable refractory characteristics of prior olivine refractory materials, but also the products of the invention are further characterized by low firing shrinkage, thus avoiding a further disadvantageous feature that may be encountered with the olivine refractories as proposed heretofore.

As to the purity of the olivine used in the practice of the invention, I have discovered that to attain the stated objects of the invention the olivine or olivine-bearing rock should contain at least 70 per cent (corresponding to about 60 per cent of magnesium orthosilicate), and advantageously at least 75 per cent, of olivine, and the following limitations are to be observed relative to the content of impurities in the rock:

1. The total content of iron, calculated as FeO, should not exceed about 10 per cent;

2. The percentage of magnesium hydrosilicate, such as serpentine, talc, chlorite, hydroxyl-bearing magnesium amphiboles, and the like, should not exceed about 15 per cent, and advantageously it is 10 per cent or less;

3. The rock should not contain more than about 10 per cent of monoclinic pyroxene, and most suitably less than about 5 per cent. The rhombic pyroxene (enstatite) which occurs in many olivine rocks now appears to be a rather harmless impurity, but for most purposes its content should not exceed 20 per cent by weight, and advantageously it will be present in an amount not exceeding about 10 per cent.

4. The feldspar content should not exceed about 10 per cent, and most suitably the rock will contain less than about 2 per cent of feldspar. The feldspars contemplated are exemplified by the potassium feldspars, anorthite, albite, and the like, and their solid solutions.

A special feature of this invention resides in my discovery that it is particularly advantageous to use rocks which contain olivine, enstatite, magnesium hydrosilicates, and the like, in such amounts that for each atom of Si there are about 1.6 to 1.9, most suitably 1.75 to 1.9, atoms of Mg. Such Si:Mg ratios provide products of excellent refractoriness, good mechanical strength at elevated temperatures, and satisfactory resistance to sudden temperature changes, which was not predictable from prior knowledge in the art because it has been felt that the best results were derived with forsterite, or by having at least 2 atoms of Mg per atom of Si.

Advantageously, also, the rock used is one containing chromium, which is a common constituent of olivine rocks.

An important feature of the invention resides in the use of the olivine in the form of a mixture of relatively coarse granules and fine powder so proportioned that the coarsely granular material forms a type of network structure the interstices of which are filled more or less completely by the relatively fine granules, or powder. More particularly, in accordance with the invention the coarsely granular material constitutes not less than about 50 per cent of the total weight used. If a smaller amount of coarsely granular material is used, or, what amounts to the same thing, if the proportion of relatively fine material is too high, there may be reduction in or lack of attainment of the benefits of the invention. For most purposes coarsely granular material as referred to herein means material in the form of grains or particles 1 mm. or more in diameter or greatest dimension, while the finely divided material is less than 1 mm. size.

The third factor in the practice of the invention is that of firing. I have discovered that in the manufacture of olivine refractories of high character from olivine alone, as just described, the properties are developed through burning, or firing, in an oxidizing atmosphere, or in alternately applied oxidizing and reducing atmospheres, from which it will be seen that in both procedures an oxidizing atmosphere is used in the firing step. Firing under oxidizing conditions appears to produce, especially at the surfaces of the olivine grains, and in cracks in the grains, highly refractory magnesium ferrite which acts both as a bond and also to improve the refractoriness of the product.

Through observation of the foregoing conditions there are produced refractory materials which do not undergo any substantial alteration in volume through shrinkage, and which are of heightened resistance to deterioration through sudden changes of temperature. Moreover, the use of the relatively expensive magnesium oxide or burned magnesite, heretofore considered necessary in the production of olivine refractories, is rendered unnecessary.

Having regard to the composition characteristics, grain sizing, and burning conditions as just described, the materials are prepared, according to the manner in which they are to be used, in the usual manner familiar to those skilled in the art. The materials may be used as ramming mixes, for making linings, bottoms, or the like, which are burned in place, or they may be formed into shapes, such as brick, which are either burned before being laid up, or which are laid up in the furnace structure and burned in place. Customary practice is applicable to these various features.

Although in the practice of the invention as just described, it is not necessary to use binders, these materials may be used for special purposes, but in most instances the amount of binder should be quite low, not more than about 5 per cent by weight, and advantageously even less, for instance 1 to 3 per cent. Both organic and inorganic binders or plasticizers known in the art may be used, such for example, as sulfite liquors, molasses, dextrine, and related substances, pectous substances, gums, clays, bentonite, and the like. Also, combinations of the organic and inorganic materials may be used. The production of refractories without binders, or with relatively small amounts of binders, has the advantage that the refractoriness of the product is not depreciated.

Also, although the use of magnesia and materials rich in magnesia is unnecessary in the practice of the invention, they may be used as cold bonding agents in the manner known in the art, for example with magnesium chloride, but in such event it is preferable that the total Mg content of the refractory does not exceed 1.9 atoms per atom of Si.

Example 1.—As exemplifying the practice of the invention, refractories made in accordance with it may be produced from an olivine rock containing, by weight, 73 percent of olivine containing 8 per cent of iron calculated as FeO, 10 per cent of serpentine, 12 per cent of rhombic pyroxene, 2 per cent of monoclinic pyroxene, 3 per cent of chromite, and 1 per cent of magnetite. The rock is crushed so that 50 per cent of it is in the form of granules having diameters between 2 and 6 mm., 20 per cent between 1 and 2 mm., 15 per cent between 0.1 and 1 mm., and the balance in the form of granules less than about 0.1 mm., suitably of cement fineness. The material is tempered with water and is used as a ramming mix for forming the hearth and walls of a metallurgical furnace. When the lining has been formed it is heated to a suitable temperature, for instance to about 1000° to 1400° C., in an oxidizing atmosphere, or in alternate oxidizing and reducing atmospheres. The oxidizing action can be increased by introducing into the furnace gases rich in oxygen or water vapor. When firing has been completed the material is allowed to cool in an oxidizing atmosphere. The burned refractory, consolidated in the firing, is of a reddish or reddish brown color.

Example 2.—As a further example of the practice of the invention, there may be used an olivine rock bearing, by weight, 85 per cent of olivine containing about 7 per cent of iron calculated as FeO, 5 per cent of monoclinic pyroxene, 5 per cent of serpentine, 3 per cent of an amphibole of the anthophyllite variety, 1 per cent of chromite, and 1 per cent of anorthite. The rock is crushed to form a mixture of granules of which 70 per cent by weight are between 1 and 8 mm. in diameter, and the balance in the form of granules less than 1 mm. in diameter with about half in the form of granules less than 0.1 mm. The crushed material is mixed with a 3 per cent solution of molasses, and it is then molded into bricks under high pressure, for instance under a pressure of about 2800 pounds per square inch. The formed bricks are dried and heated to about 1300° C., in an oxidizing atmosphere; during the burning operation the brick acquire a brownish red color.

Example 3.—The olivine rock of Example 2 is crushed to provide granules of which 50 per cent by weight are between 8 and 30 mm. in diameter, 30 per cent between 1 and 8 mm., and 20 per cent less than 1 mm. The material is mixed with about 2 per cent of plastic clay and about 8 per cent of water, both reckoned on the weight of the olivine rock used. The batch is used either for forming rammed linings or for molding shapes, and after laying up or molding is dried and heated as described above, for instance at 1200° C.

I have found further that the properties of the refractories thus described can be further improved by the addition of materials rich in chromium, whereby the crushing strength of the products, both at room and elevated temperatures, is materially increased, and the porosity of the product decreased. For instance tests have shown that the porosity of the product may be lowered from 23 to 18 per cent by the use of chromium compounds in accordance with the invention. Moreover, the use of chromium compounds likewise increases the resistance of the products to sudden temperature changes. These results are attained particularly with the use of olivines meeting the composition characteristics delineated hereinabove, and those containing chromium, usually as lean chromite, are further improved in this manner.

In the practice of the invention there are used such chromium-containing materials as contain at least about 50 per cent by weight of $Cr_2O_3$ after being heated to about 1000° C., examples being chrome ore and salts of chromium, such as the nitrate and sulfate of trivalent chromium, chromium oxide ($Cr_2O_3$), chromium hydroxide, and chromates, such as ammonium chromate or dichromate, and magnesium chromite.

In the practice of the invention the chromium-containing material is added, at least in part, in finely divided state, in fact, in a finer degree of division than the principal mass of olivine. It may be added either as a very fine powder, or as a solution. For instance, solid chromium compounds can be added as a very fine powder to the olivine raw material after being crushed and milled, or the solid chromium compound can be milled with the olivine, or a portion thereof, in the production of the finely divided olivine fraction, the mixture being then added to the coarsely granular olivine material. Or, there may be added to the olivine material soluble chromium compounds, such as those just referred to, either as solids or in the form of an aqueous solution, or in solution with plasticizers where they are used.

While the exact action of the chromium compound is not certainly understood, I now believe that its favorable effect is conditioned, at least in part, upon formation of a compound such as $FeCr_2O_4$, or solid solutions of $FeCr_2O_4$ and $Fe_3O_4$, which bind part of the iron content of the raw material in particles of very refractory, probably crystallized, chromium compounds and solid solutions. These particles thus effect a cementing of the silicate particles in the refractory.

The amount of chromium compound added will depend in part upon the iron content of the raw material and the result desired. For most purposes it should not be less, based on the weight of the refractory product, than about 0.3 per cent, calculated as $Cr_2O_3$, and for most purposes from about 1 to 3 per cent of chromium, calculated as $Cr_2O_3$, will suffice, although in some instances larger amounts, for instance as high as 10 per cent, may be used.

In addition, chromium compounds in the form of coarse granules may likewise be added, chromite being especially suitable for this purpose. The grain size of this addition material may correspond approximately to the size of the coarse grains of olivine material, and as much as 30 per cent, or even up to 50 per cent, based on the weight of the structural olivine material, may be added.

The refractories containing chromium are worked up and treated as described hereinabove.

*Example 4.*—An olivine of the composition given in Example 2 is ground in the manner described in that example. To the ground rock there is added 4 per cent by weight of chromite containing 53 per cent of $Cr_2O_3$, 40 per cent of FeO, 3 per cent of MgO and 4 per cent of $SiO_2$, this ore being ground to particles less than 0.1 mm. size. The mixture is tempered with an aqueous solution of cellulose caustic waste, and it is then formed into brick by molding under a pressure of about 2150 pounds per square inch. The brick are dried and fired at 1300° C. in an oxidizing atmosphere.

*Example 5.*—There is used olivine rock of the composition and grain size stated in Example 2. To this is added 1 per cent by weight of chromium hydroxide (containing about 85 per cent of $Cr_2O_3$ and 15 per cent of water), the chromium oxide being first mixed with a 10 per cent solution of molasses to form a paste containing six parts by weight of molasses solution to each part of chromium hydroxide. The olivine rock is carefully mixed with the paste, and the mixture is used as described previously for the production of molded shapes or rammed masses which are burned in an oxidizing atmosphere.

*Example 6.*—Using olivine rock of the composition and grain size given in Example 2, there is added 8 per cent by weight, based on the olivine rock, of a 15 per cent solution of ammonium chromate. The mixture is then used for forming molded shapes of rammed masses which are fired in an oxidizing atmosphere.

There may be added also, in relatively small amounts, other materials commonly used in the production of refractories, such as compounds of aluminum, silicon, titanium and the like. It is particularly advantageous to use small amounts of very hard, crystallized substances such as quartz, spinel, corundum, and the like. Such substances may be added in amounts between, for example, about 0.2 to 3, preferably 0.3 to 2.0, per cent by weight. Their use improves the mechanical properties of the product, particularly with regard to resistance against sudden temperature changes.

Likewise, there may be added mineralizers, or catalysts, of which a variety are known and used in the art, such as boric acid and borates. The amount of mineralizer should generally be small, for instance not exceeding about 5 per cent.

The invention is not restricted to the exact procedural details described hereinabove, and obviously variations in the fabricating and related procedures are permissible, such variations being well known and commonly applied in the art. Thus, the materials may be calcined prior to use, or they may be subjected to repeated heating with alternating crushing and milling; for instance, materials that have been previously heated, such as imperfect brick or shapes may be recrushed, mixed with amounts of fresh raw materials, and shaped as desired. Melting of any substantial amount of the batch is to be avoided, however, in firing.

From what has been said it will be observed that the invention is not restricted to the direct production of fired articles, but that it is applicable not only to the manufacture of articles which are shaped and fired prior to use or shipment, but equally to refractory materials which are compounded, laid up in the structure in which they are to be used, and burned in place, and therefore as ramming mixtures, mortars, and the like. Also, through the use of suitable temporary binders bricks and other shapes may be formed and dried, to be later laid up and burned in place. If desirable, there may be added, for these special purposes, hydraulic binders, such as calcium hydroxide, provided care be taken to use them in amounts so small as not to exert any appreciable lowering of the refractory properties. Calcium hydroxide, for instance, can be used in amounts which do not materially exceed about 2 per cent by weight.

The invention thus provides high value refractory products from very cheap raw materials, thus dispensing with the use of relatively costly pure olivines, and with magnesia and magnesia-rich materials, the cost of which may be several times that of the olivine rock used in the practice of this invention. The production costs of the refractories provided by the invention are reduced compared with known methods. The products are of excellent refractoriness and they show excellent stability under load at high temperatures, constancy of volume and stability against temperature change.

According to the provisions of the patent statutes, I have explained the principle and mode of use of my invention and have described what I now consider to represent its best embodiment. However, I desire to have it understood that, within the scope of the appended claims, the invention may be practiced otherwise than as specifically described.

I claim:

1. That method of making refractories comprising preparing a batch containing a mixture of coarse and fine granules of olivine-bearing rock of which at least 50 per cent are relatively coarse granules, and said rock containing more than about 70 per cent of olivine mineral, less than about 10 per cent each of monoclinic pyroxene, feldspar, and iron calculated as FeO, and less than about 15 per cent of magnesium hydrosilicates; and shaping and drying the mixture to form a refractory article.

2. A method according to claim 1, the refractory being burned in an oxidizing atmosphere.

3. That method of making refractories comprising preparing a batch containing a mixture of coarse and fine granules of olivine-bearing rock of which at least 50 per cent of the granules are greater than 1 mm. in maximum dimension, and said rock containing more than about 75 per cent of olivine mineral, less than about 5 per cent of monoclinic pyroxene, less than about 2 per cent of feldspar, and less than about 10 per cent of iron calculated as FeO, and less than about 15 per cent of magnesium hydrosilicates; shaping the mixture to form a refractory article, and burning the shaped article in an oxidizing atmosphere.

4. That method of making refractories comprising preparing a batch containing a mixture of coarse and fine granules of olivine-bearing rock of which at least 50 per cent are relatively coarse granules, the balance consisting of granules less than 1 mm. in maximum dimension, and said rock containing more than about 70 per cent of olivine mineral, not more than about 10 per cent each of monoclinic pyroxene, feldspar, and iron calculated as FeO, and not more than about 15 per cent of magnesium hydrosilicates; shaping the mixture to form a refractory article, and burning the shaped article in an oxidizing atmosphere.

5. That method of making refractories comprising forming from a mixture of coarse and fine granules of olivine-bearing rock of which at least 50 per cent are relatively coarse granules, a batch in which the ratio Mg:Si is between 1.6:1 to 1.9:1, said rock containing more than about 70 per cent of olivine mineral, less than about 10 per cent each of monoclinic pyroxene, feldspar, and iron calculated as FeO, and less than about 15 per cent of magnesium hydrosilicates; and shaping and drying the mixture to form a refractory article.

6. A method according to claim 5, the refractory being burned in an oxidizing atmosphere.

7. That method of making refractories comprising forming from a mixture of coarse and fine granules of olivine-bearing rock of which at least 50 per cent of the granules are less than 1 mm. in maximum dimension, a batch in which the ratio Mg:Si is between 1.6:1 to 1.9:1, said rock containing more than about 70 per cent of olivine mineral, not more than about 10 per cent each of monoclinic pyroxene, feldspar, and iron calculated as FeO, and not more than about 15 per cent of magnesium hydrosilicates; shaping the mixture to form a refractory article, and burning the shaped article in an oxidizing atmosphere.

8. That method of making refractories comprising preparing a batch containing a mixture of coarse and fine granules of olivine-bearing rock of which at least 50 per cent are relatively coarse granules; and said rock containing more than about 70 per cent of olivine mineral, less than about 10 per cent each of monoclinic pyroxene, feldspar, and iron calculated as FeO, and less than about 15 per cent of magnesium hydrosilicates; adding a chromium compound in an amount less than the olivine, and shaping and drying the mixture to form a refractory article.

9. A method according to claim 8, the formed refractory being burned in an oxidizing atmosphere.

10. That method of making refractories comprising preparing a batch containing a mixture of coarse and fine granules of olivine-bearing rock of which at least 50 per cent are relatively coarse granules, and said rock containing more than about 70 per cent of olivine mineral, less than about 10 per cent each of monoclinic pyroxene, feldspar, and iron calculated as FeO, and less than about 15 per cent of magnesium hydrosilicates; adding from about 0.3 to 10 per cent of a chromium compound more finely divided than said coarse olivine, shaping the mixture to form a refractory article, and burning the shaped article in an oxidizing atmosphere.

11. A method according to claim 8, said coarse olivine granules being at least 1 mm. in maximum dimension, and the refractory being burned in an oxidizing atmosphere.

12. That method of making refractories comprising preparing a batch containing a mixture of coarse and fine granules of olivine-bearing rock of which at least 50 per cent of the granules are at least 1 mm. in maximum dimension, and said rock containing more than about 70 per cent of olivine mineral, less than about 10 per cent each of monoclinic pyroxene, feldspar, and iron calculated as FeO, and less than about 15 per cent of magnesium hydrosilicates, adding a chromium material containing at least 50 per cent of $Cr_2O_3$ after heating to 1000° C. in an amount less than the olivine and partly more finely divided than said coarse olivine, shaping the mixture to form a refractory article, and burning the shaped article in an oxidizing atmosphere.

13. That method of making refractories comprising preparing a batch containing a mixture of coarse and fine granules of olivine-bearing rock of which at least 50 per cent of the granules are at least 1 mm. in maximum dimension, said rock containing more than about 75 per cent of olivine mineral, less than about 5 per cent of monoclinic pyroxene, less than about 2 per cent of feldspar, less than about 10 per cent of iron calculated as FeO, and less than about 10 per cent of magnesium hydrosilicates; adding about 0.3 to 10 per cent of a chromium compound more finely divided than said coarse olivine, adding chrome ore in coarse particles in an amount such that the total chromium compound does not exceed the olivine, shaping the mixture to form a refractory article, and burning the shaped article in an oxidizing atmosphere.

14. That method of making refractories comprising preparing a batch containing a mixture of coarse and fine granules of olivine-bearing rock of which at least 50 per cent of the granules are at least 1 mm. in maximum dimension, and said rock containing more than about 75 per cent of olivine mineral, less than about 5 per cent of monoclinic pyroxene, less than about 2 per cent of feldspar, less than about 10 per cent of iron calculated as FeO, and less than about 10 per cent of magnesium hydrosilicates, adding a chromium compound in an amount less than the olivine and at least in part more finely divided than said coarse olivine, the batch having an Mg:Si ratio of between 1.6:1 to 1.9:1 shaping the mixture to form a refractory article, and burning the shaped article in an oxidizing atmosphere.

15. A refractory material formed from a batch containing granulated rock of which at least 50 per cent consists of coarse granules and containing more than about 70 per cent of olivine mineral, not more than about 10 per cent each of monoclinic pyroxene, feldspar, and iron calculated as FeO, and not more than about 15 per cent of magnesium hydrosilicates.

16. A refractory material formed from a batch containing granulated rock of which at least 50 per cent consists of granules at least 1 mm. in maximum dimension and containing more than about 70 per cent of olivine mineral, not more than about 10 per cent each of monoclinic pyroxene, feldspar, and iron calculated as FeO, and not more than about 15 per cent of magnesium hydrosilicates.

17. A refractory material formed from a batch containing granulated rock of which at least 50 per cent consists of granules at least 1 mm. in maximum dimension and containing more than about 75 per cent of olivine mineral, less than about 5 per cent of monoclinic pyroxene, less than about 2 per cent of feldspar, less than about 10 per cent of iron calculated as FeO, and less than about 10 per cent of magnesium hydrosilicates.

18. A refractory material formed from a major proportion of granulated rock of which at least 50 per cent consists of coarse granules and containing more than about 70 per cent of olivine mineral, less than about 10 per cent each of monoclinic pyroxene, feldspar, and iron calculated as FeO, and less than about 15 per cent of magnesium hydrosilicates, and chromium compound in an amount less than the olivine and more finely divided than said coarse olivine.

19. A refractory material formed from a major proportion of granulated rock of which at least 50 per cent consists of coarse granules, and containing more than about 70 per cent of olivine mineral, less than about 10 per cent each of monoclinic pyroxene, feldspar, and iron calculated as FeO, and less than about 15 per cent of magnesium hydrosilicates; and about 0.3 to 10 per cent of chromium compound more finely divided than said coarse olivine.

20. A refractory according to claim 18, said coarse granules being at least 1 mm. in maximum dimension.

21. A burned refractory material formed from granulated rock of which at least 50 per cent consists of coarse granules at least 1 mm. in diameter, and containing more than about 70 per cent of olivine mineral, less than about 10 per cent each of monoclinic pyroxene, feldspar, and iron calculated as FeO, and less than about 15 per cent of magnesium hydrosilicates; the refractory having been burned in an oxidizing atmosphere.

22. A burned refractory material formed from a major proportion of granulated rock of which at least 50 per cent consists of coarse granules at least 1 mm. in diameter, and containing more than about 70 per cent of olivine mineral, less than about 10 per cent each of monoclinic pyroxene, feldspar, and iron calculated as FeO, and less than about 15 per cent of magnesium hydrosilicates; and about 0.3 to 10 per cent of chromium compound containing at least 50 per cent of $Cr_2O_3$ after heating to 1000° C., said chromium compound being more finely divided than said coarse olivine, the refractory having been burned in an oxidizing atmosphere.

23. A refractory material formed from a batch containing granulated rock of which at least 50 per cent consists of coarse granules and containing more than about 70 per cent of olivine mineral, not more than about 10 per cent each of monoclinic pyroxene, feldspar, and iron calculated as FeO, and not more than about 15 per cent of magnesium hydrosilicates, the batch having an Mg:Si ratio of between 1.6:1 to 1.9:1.

24. A burned refractory material formed from a major proportion of granulated rock of which at least 50 per cent consists of coarse granules at least 1 mm. in diameter, and containing more than about 70 per cent of olivine mineral, less than about 10 per cent each of monoclinic pyroxene, feldspar, and iron calculated as FeO, and less than about 15 per cent of magnesium hydrosilicates; and a chromium compound in an amount less than the olivine and at least partly more finely divided than said coarse olivine, the batch having an Mg:Si ratio of between 1.6:1 to 1.9:1 and the refractory having been burned in an oxidizing atmosphere.

VICTOR MORITZ GOLDSCHMIDT.